(12) United States Patent
Gueugneau et al.

(10) Patent No.: US 11,358,357 B2
(45) Date of Patent: *Jun. 14, 2022

(54) MOLDING ELEMENT FOR MANUFACTURING A NOISE REDUCING TREAD

(71) Applicant: Compagnie Generale Des Etablissements Michelin, Clermont-Ferrand (FR)

(72) Inventors: Anthony Gueugneau, Tokyo (JP); Romain Calvel, Tokyo (JP); Bernard Villeneuve, Tokyo (JP); Khotchakorn Pengsaloong, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 738 days.

This patent is subject to a terminal disclaimer.

(21) Appl. No.: 16/311,380

(22) PCT Filed: Jun. 22, 2016

(86) PCT No.: PCT/JP2016/003018
§ 371 (c)(1),
(2) Date: Dec. 19, 2018

(87) PCT Pub. No.: WO2017/221283
PCT Pub. Date: Dec. 28, 2017

(65) Prior Publication Data
US 2019/0184659 A1      Jun. 20, 2019

(51) Int. Cl.
*B29D 30/06* (2006.01)
*B29C 33/30* (2006.01)
(Continued)

(52) U.S. Cl.
CPC .......... *B29D 30/0606* (2013.01); *B29C 33/02* (2013.01); *B29C 33/306* (2013.01);
(Continued)

(58) Field of Classification Search
CPC .................... B29D 30/0606; B29D 2030/0612
See application file for complete search history.

(56) References Cited

U.S. PATENT DOCUMENTS 8,506,275 B2 *  8/2013  Villeneuve .............. B29C 33/10
                                                    425/28.1
9,108,375 B2 *  8/2015  Roty .................. B29D 30/0606
(Continued)

FOREIGN PATENT DOCUMENTS

JP     2007210569 A    8/2007
WO   2002-060705 A1    8/2002
(Continued)

OTHER PUBLICATIONS

Int'l Search Report for PCT/JP2016/003018, dated Sep. 6, 2016.

*Primary Examiner* — Niki Bakhtiari
*Assistant Examiner* — John J DeRusso
(74) *Attorney, Agent, or Firm* — Dickinson Wright PLLC; Steven Hurles

(57) ABSTRACT

A molding element having a molding surface forming a contact face and a groove forming rib portion forming the groove comprising two opposed rib side faces and a rib top face connecting two rib side faces. The groove forming rib portion provides at least one space opening to at least one of the rib side faces and/or to the rib top face. An insert is received in the space. The insert comprises a cavity for forming a closing device in the groove. The cavity has two opposed cavity faces and opens to at least two faces of the insert corresponding to the faces of the groove forming rib portion. The insert comprises at least one cutting means
(Continued)

extending and/or projecting in a direction the groove forming rib portion extends for cutting a material filled in the cavity during demolding.

12 Claims, 7 Drawing Sheets

(51) Int. Cl.
- *B29D 30/00* (2006.01)
- *B29C 33/42* (2006.01)
- *B29L 30/00* (2006.01)
- *B60C 19/00* (2006.01)
- *B60C 11/04* (2006.01)
- *B60C 11/13* (2006.01)
- *B29C 33/02* (2006.01)

(52) U.S. Cl.
CPC .............. *B29C 33/42* (2013.01); *B29D 30/00* (2013.01); *B60C 11/047* (2013.01); *B60C 11/1353* (2013.01); *B60C 19/002* (2013.01); *B29D 2030/0607* (2013.01); *B29D 2030/0612* (2013.01); *B29D 2030/0616* (2013.01); *B29L 2030/002* (2013.01); *B60C 2011/1361* (2013.01)

(56) References Cited

U.S. PATENT DOCUMENTS

| | | | |
|---|---|---|---|
| 9,616,597 B2 * | 4/2017 | Chades | .................... B29C 33/42 |
| 9,616,627 B2 * | 4/2017 | Villeneuve | ......... B29D 30/0606 |
| 9,688,039 B2 | 6/2017 | Pialot, Jr. | |
| 10,780,661 B2 * | 9/2020 | Gueugneau | ......... B60C 11/0323 |
| 2004/0016491 A1 | 1/2004 | Martin et al. | |
| 2012/0114777 A1 * | 5/2012 | Villeneuve | ......... B29D 30/0606 |
| | | | 425/46 |
| 2014/0216619 A1 | 8/2014 | Shimanaka et al. | |
| 2015/0174842 A1 | 6/2015 | Pialot, Jr. | |
| 2016/0129652 A1 | 5/2016 | Kaneko | |

FOREIGN PATENT DOCUMENTS

| | | |
|---|---|---|
| WO | 2013-120783 A1 | 8/2013 |
| WO | 2013-178473 A1 | 12/2013 |
| WO | 2014-198653 A1 | 12/2014 |
| WO | 2015080772 A1 | 6/2015 |

* cited by examiner

[Fig. 1]
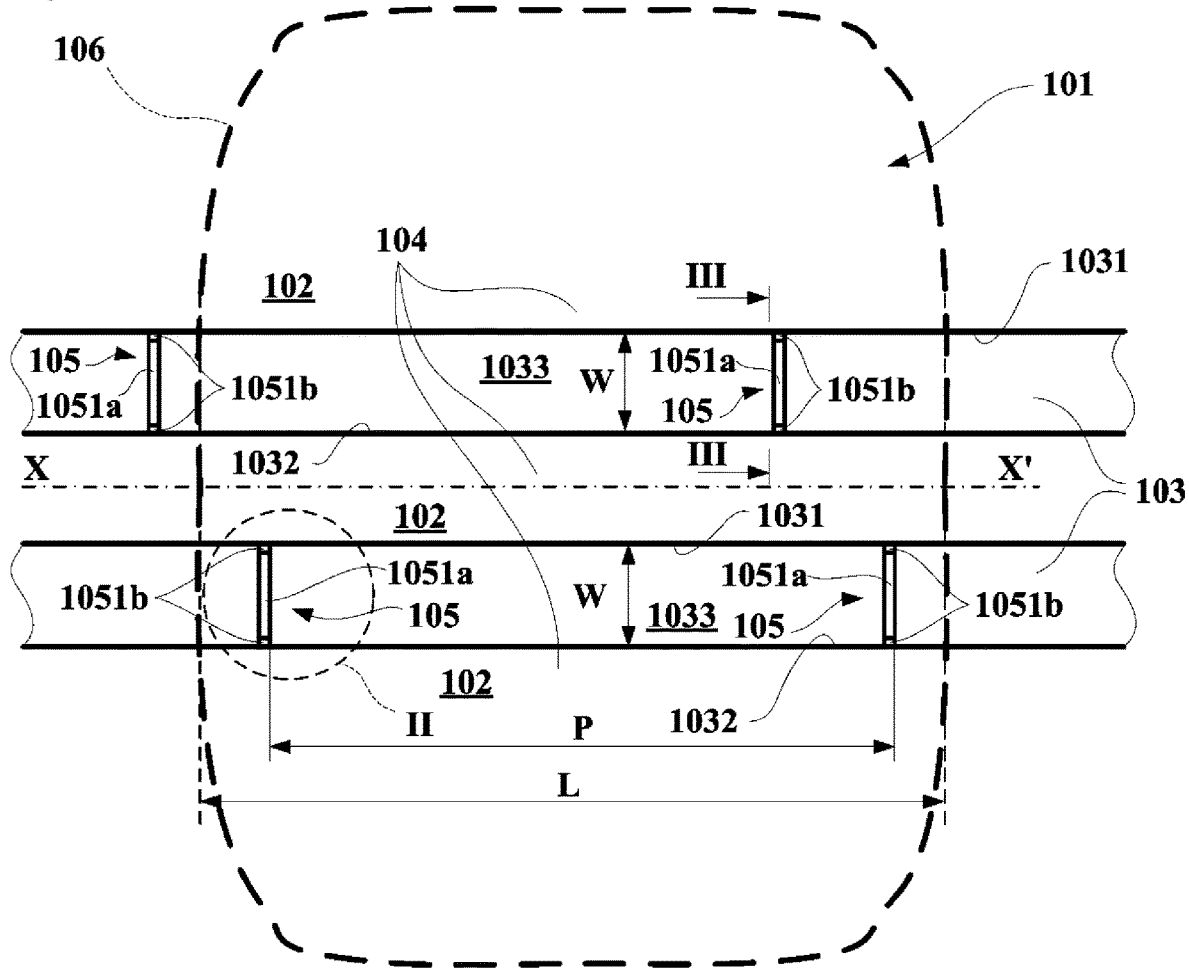
[Fig. 2]
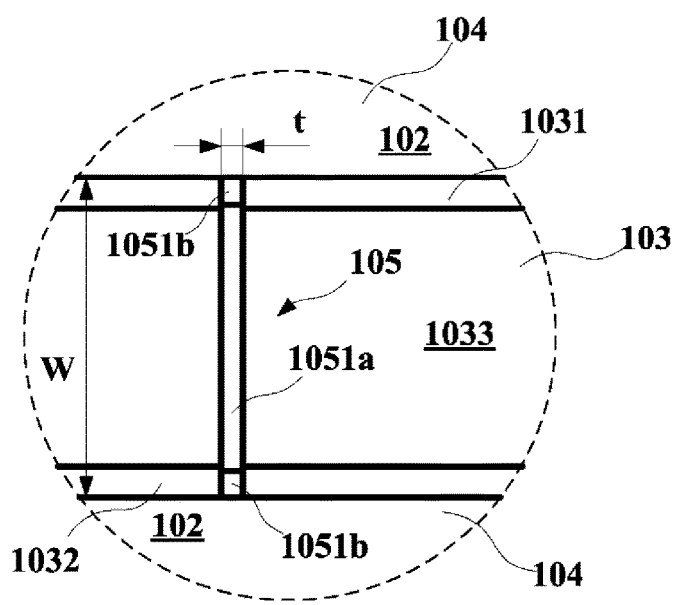

[Fig. 3]
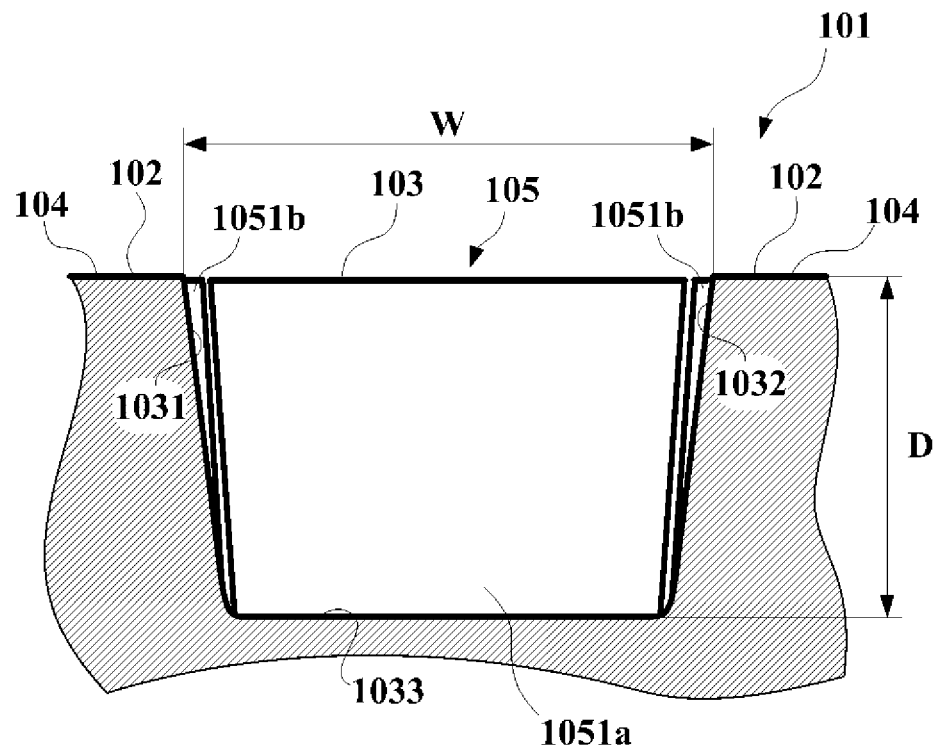
[Fig. 4]
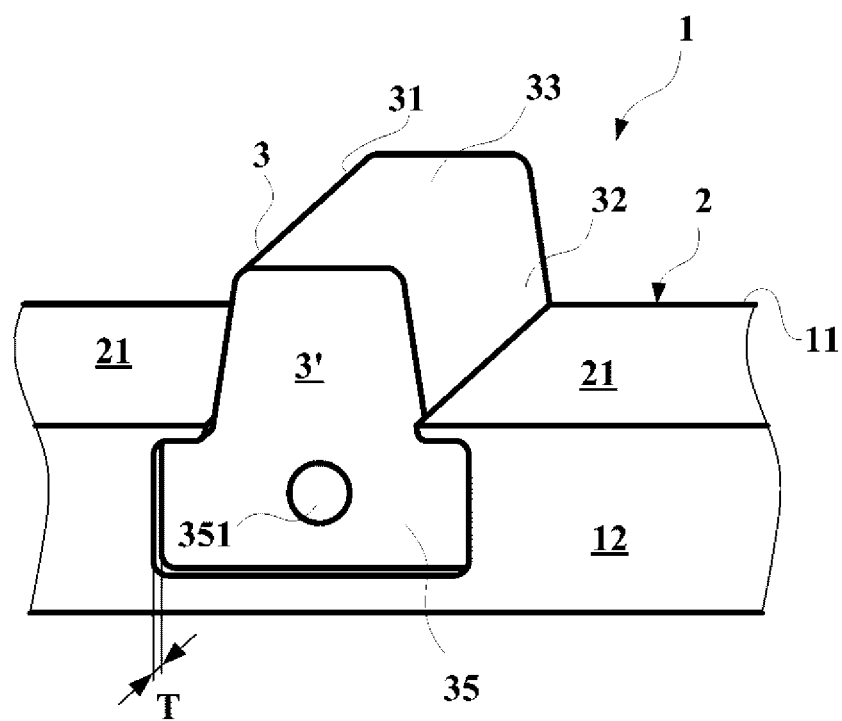

[Fig. 5]
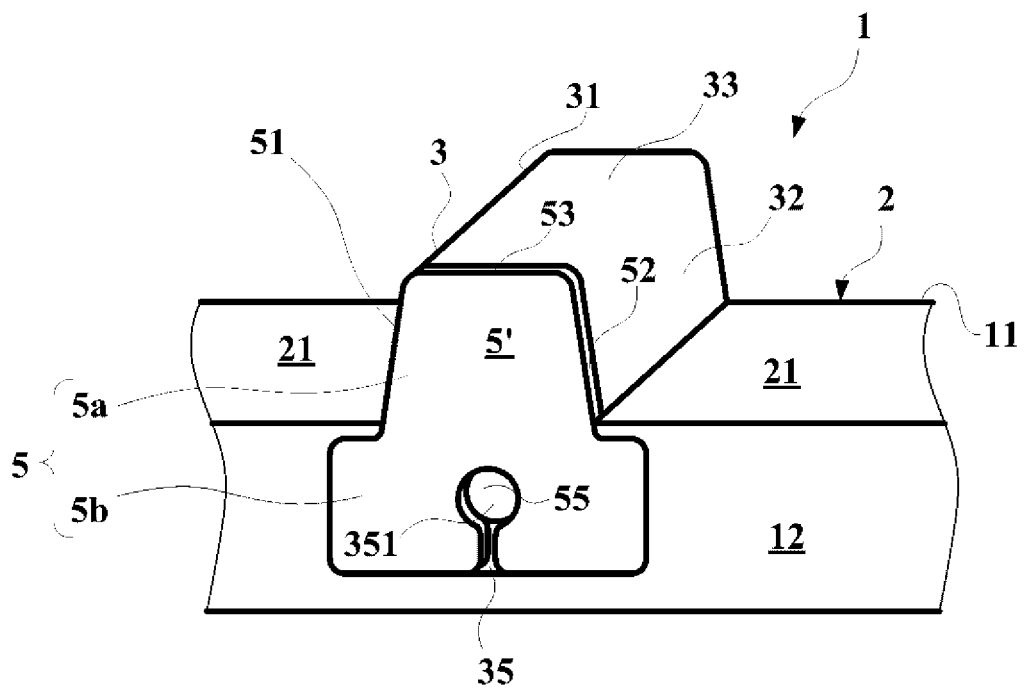
[Fig. 6]
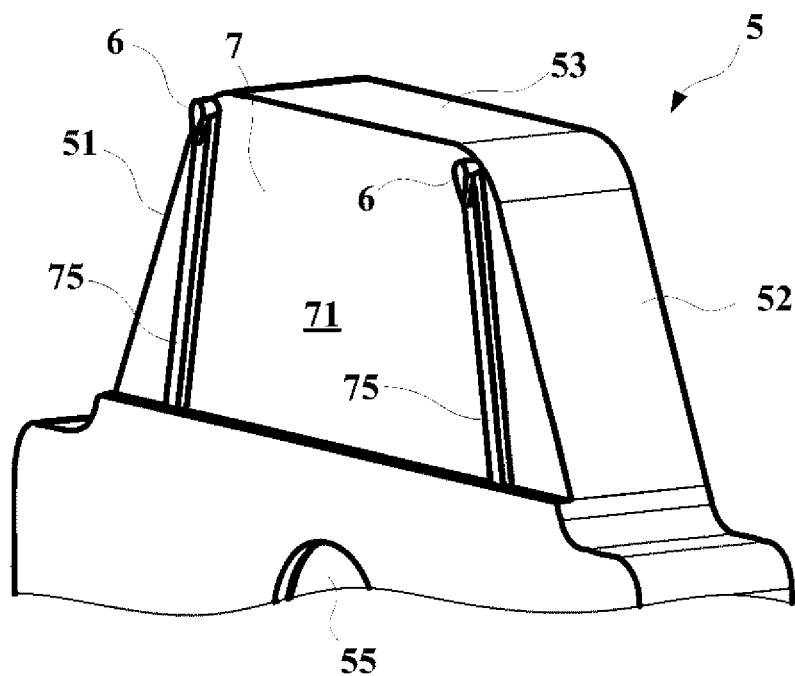

[Fig. 7]
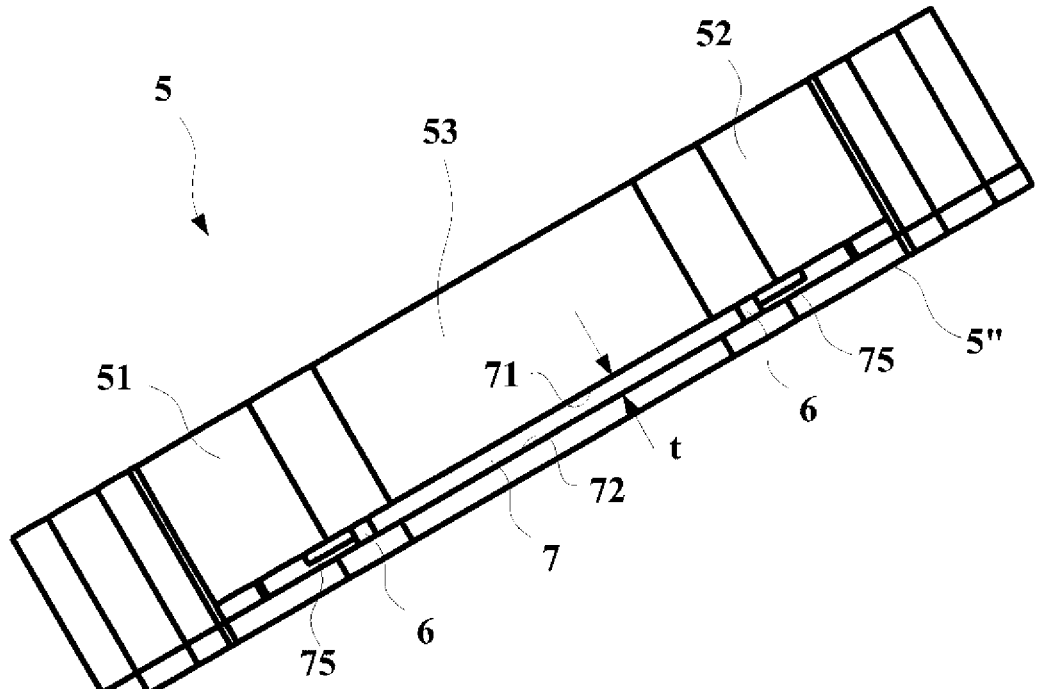
[Fig. 8]
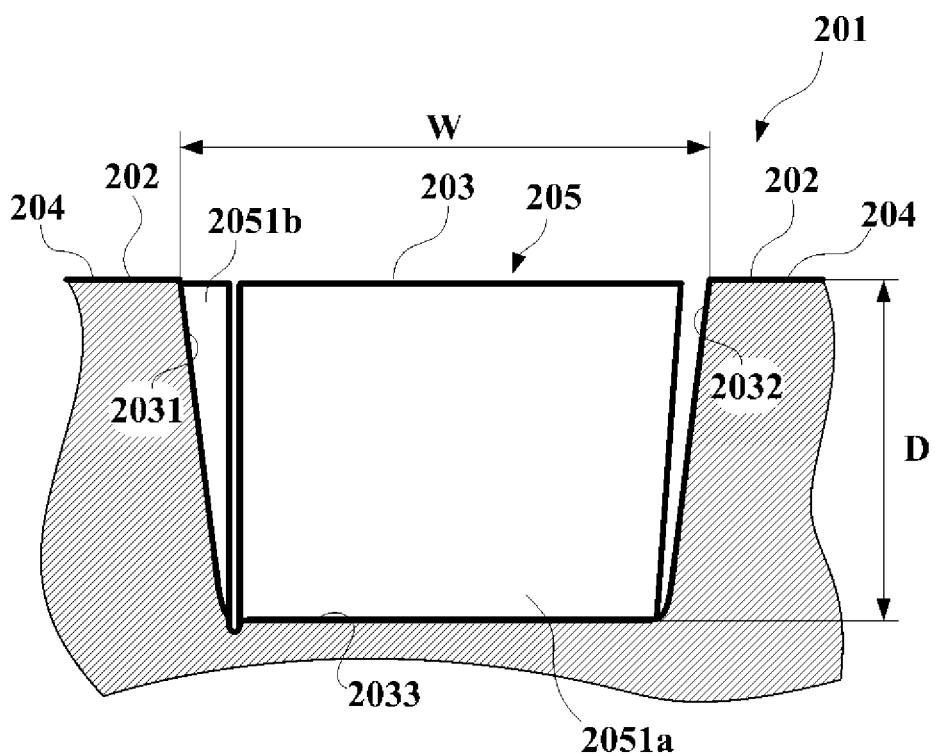

[Fig. 9]
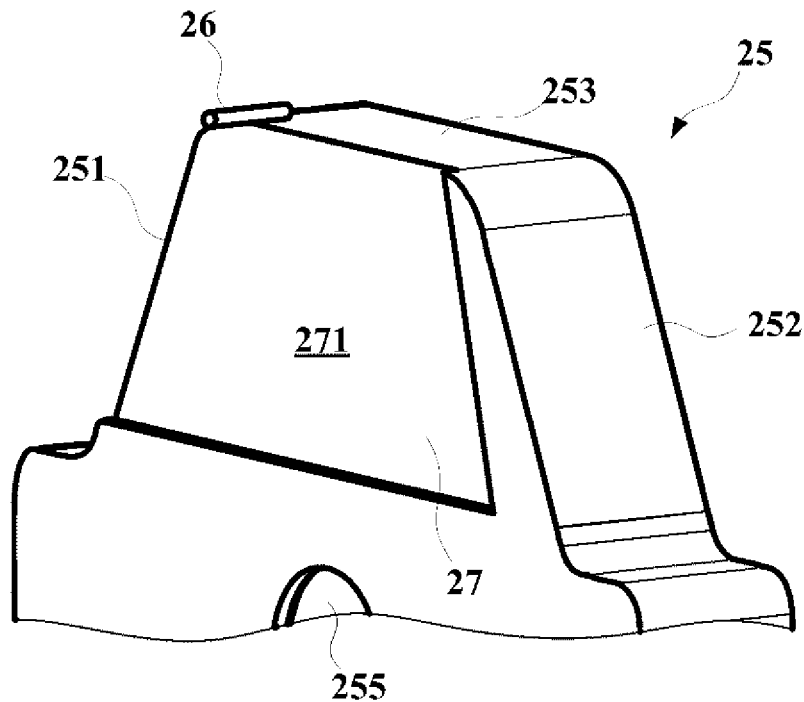
[Fig. 10]
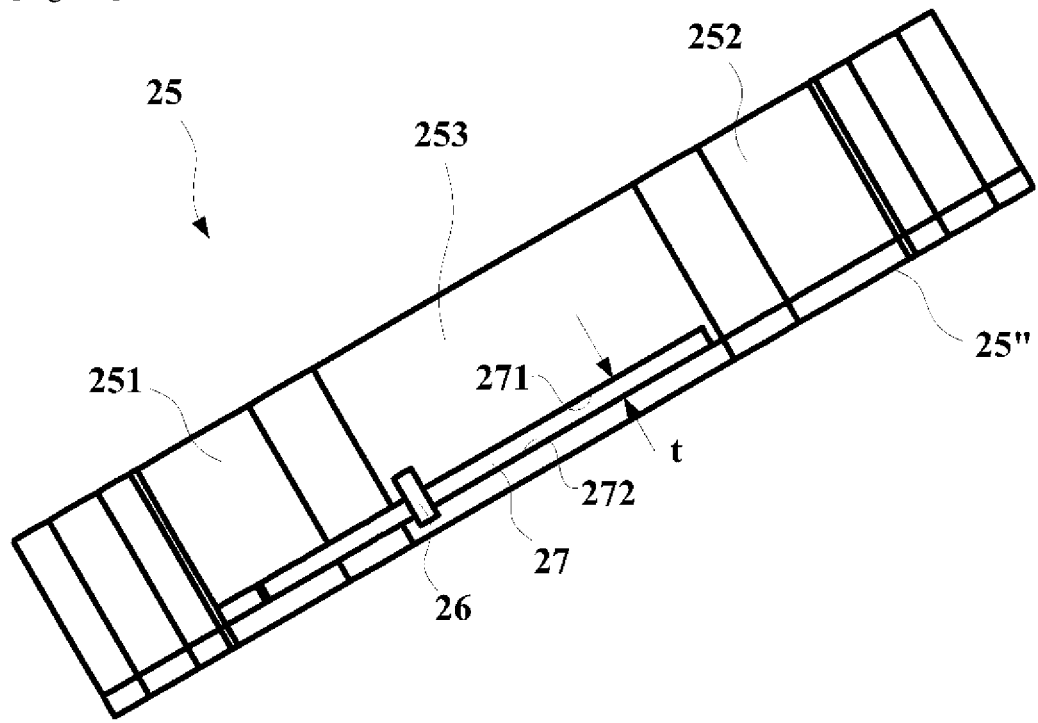

[Fig. 11]
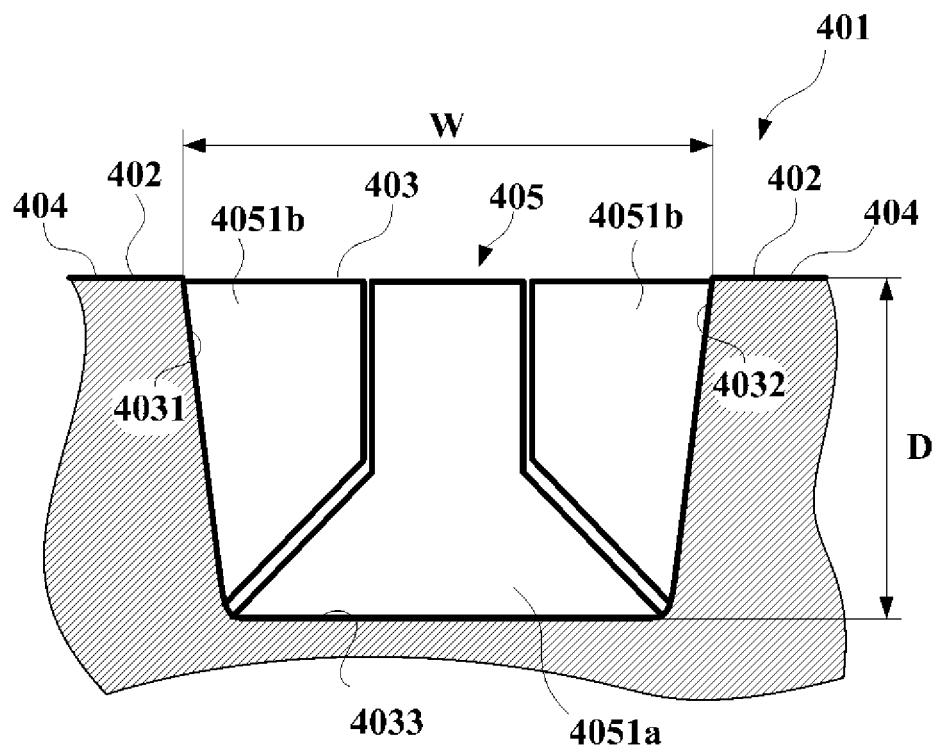
[Fig. 12]
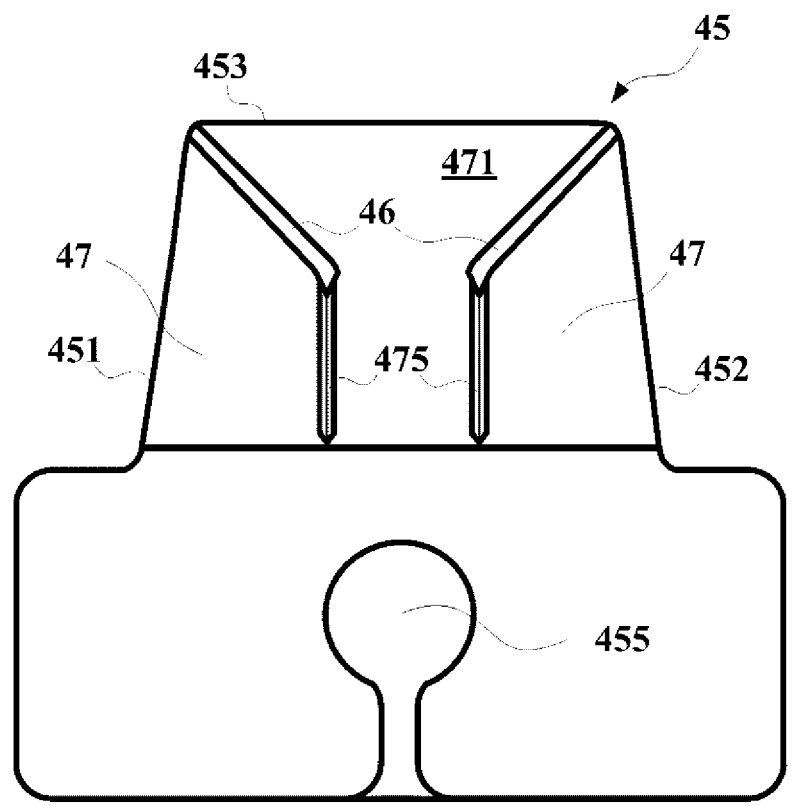

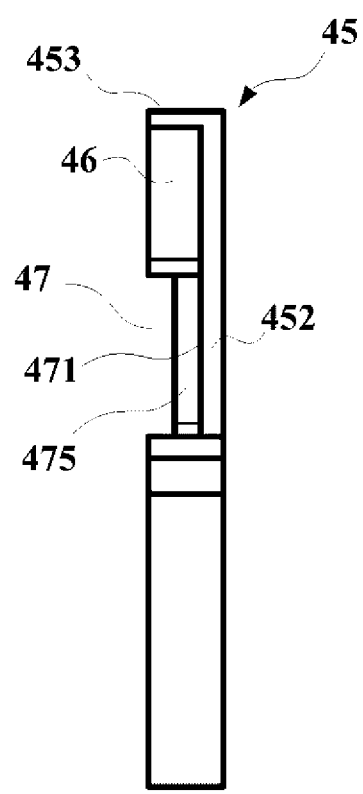

MOLDING ELEMENT FOR MANUFACTURING A NOISE REDUCING TREAD

CROSS-REFERENCE TO RELATED APPLICATION

The present application claims priority to PCT International Patent Application Serial No. PCT/JP2016/003018, filed Jun. 22, 2016, entitled "MOLDING ELEMENT FOR MANUFACTURING A NOISE REDUCING TREAD".

BACKGROUND OF THE INVENTION

1. Field of the Invention

The present disclosure relates to a molding element, in particular to a molding element for a mold used for manufacturing a tread for a tire having a closing device in a groove.

2. Related Art

A groove resonance is generated by occurrence of resonance in an air column defined between a groove in a tread and a road surface in contact with the tire. The frequency of this groove resonance is dependent on a length of the air column formed between groove and the road surface in the contact patch.

This groove resonance has a consequence in an interior noise and an exterior noise on a vehicle equipping such tires, a frequency of which interior and exterior noise is often at around 1 kHz where human ear is sensitive.

In order to reduce such groove resonance, it is known to provide a plurality of closing device in the form of a thin flexible fence made of rubber-based material in each groove. It is effective that each flexible fence covers all or at least major part of the sectional area in the groove. Each flexible fence can extend from a groove bottom, or from at least one of a groove sidewall delimiting such groove. Because being relatively thin, each flexible fence has to bend for opening the groove section to flow water on the road surface, in particular on the wet road.

Thanks to such closing device, the length of the air column is reduced so as to be shorter than the total length of groove in a contact patch, which leads to change the frequency of groove resonance. This change of resonance frequency makes the sound generated by the groove resonance less sensitive to human ear.

For preserving function of drainage, in case of driving in rainy weather, it is necessary for such flexible fence to bend in a suitable way under the action of the pressure of water for opening the section of the groove. Several solutions have been proposed using this type of closing device to reduce groove resonance of the groove.

WO2013/178473A1 discloses, in FIG. 4, a method for manufacturing a tread for a tire provided with at least one flexible wall (closing device) in a groove, the method comprising steps of molding the tread with a groove and at least one connecting element arranged inside the groove transversely so as to connect sidewalls of the groove, and cutting the connecting element at the junction with each the sidewall of the groove. However with such method productivity of such tread is low, as the method requires additional process of cutting the connecting element after molding.

WO2013/120783A1 discloses, in FIG. 3, a mold for molding a tread for a tire provided with at least one closing device, the mold comprising two cavities for the flexible fence separated by a first element.

However with such mold, since rubber entrance into each the cavity is limited to one single face of a rib of the mold for ensuring bending of the flexible fence for liquid drainage, it is difficult to obtain constantly a good molding of the flexible fence in particular when a thickness of the flexible fence is thin (a thin flexible fence, that is to say having the thickness less than 0.6 mm for example), which leads less productivity with the thin flexible fence, or difficulty to obtain required bending of the flexible fence by hydrodynamic pressure for liquid drainage due to necessity to increase the thickness of the flexible fence.

Therefore, there is a need for a molding element which is capable to mold a thin flexible fence such that the molded flexible fence can appropriately bend by hydrodynamic pressure for liquid drainage while improving productivity of the tread provided with the flexible fence of the closing device at the same time.

Definitions:

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "mold" means a collection of separate molding elements which, when brought closer towards one another, delimit a toroidal molding space.

A "molding element" of a mold means part of a mold. A molding element is, for example, a mold segment.

A "molding surface" of a molding element means a surface of the mold that is intended to mold a surface of the tread.

A "groove" is a space between two rubber faces/sidewalls which do not contact between themselves under usual rolling condition connected by another rubber face/bottom. A groove has a width and a depth.

SUMMARY OF THE INVENTION

It is thus an object of the disclosure to provide a molding element for a mold used for manufacturing a tread of a tire, such molding element can improve productivity for manufacturing a tread provided with a closing device in a groove having a thin flexible fence of the closing device.

The present disclosure provide a molding element for a mold used for manufacturing a tread of a tire having a plurality of contacting element delimited by a plurality of groove, the molding element having a molding surface for forming a contact face of the contacting elements intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing at least one space opening to at least one of the rib side faces and/or to the rib top face and an insert being received in the space, the insert having two insert side faces which at least one of the insert side face being for forming a portion of the groove side face with the rib side face and an insert top face for forming a portion of the groove bottom with the rib top face, the insert comprising a cavity for forming a closing device in the groove, the cavity having two opposed cavity faces distant in a direction the groove forming rib portion extending with a distance t, the cavity opens to at least two faces of the insert corresponding to the faces of the groove forming rib portion the space being opening to, and the insert comprises at least one cutting means extending and/or projecting in a direction the groove forming rib portion extends for cutting a material filled in the cavity during demolding.

This arrangement improves productivity of a tread provided with a thin flexible fence of a closing device in a groove.

Since the cavity opens to at least two faces of the insert corresponding to the faces of the groove forming rib portion the space being opening to, it is possible to secure a sufficient entrance to facilitate a penetration of a material for forming the flexible fence of the closing device into the cavity leading a good molding of the flexible fence even a thickness of the flexible fence is thin, resulting improvement on productivity for manufacturing a tread provided with the flexible fence of the closing device in the groove while ensuring an accurate and thin thickness of the flexible fence of the closing device to permit a correct bending for liquid drainage.

Since the insert comprises at least one cutting means extending and/or projecting in a direction the groove forming rib portion extends for cutting the material filled in the cavity during demolding, forming of the flexible fence of the closing device is able to complete with an action during demolding without any additional process; with the action during demolding, the cutting means forms the flexible fence of the closing device by cutting the material filled in the cavity of the insert, resulting further improvement on productivity for manufacturing the tread provided with the flexible fence of the closing device in the groove.

In another preferred embodiment, the space opens to the rib top face and to both the rib side faces, and the cavity opens to the insert top face and to both the insert side faces, and the insert comprises at least two cutting means.

According to this arrangement, it is possible to further improve productivity of the tread provided with the flexible fence of the closing device in the groove, as it is possible to secure the entrance reliably to facilitate the penetration of the material for forming the flexible fence of the closing device into the cavity.

By comprising at least two cutting means, it is possible to obtain at least one flexible fence extending from the groove bottom and two flexible fences extending from each the groove side faces that would provide increasing degree of freedom to design and to position the flexible fence of the closing device while ensuring that the closing device effectively covering as broader cross sectional area of the groove as possible.

In another preferred embodiment, the cutting means is placed on the insert top face as to protrude into or to extend above the cavity in a direction the groove forming rib portion extends.

According to this arrangement, it is possible to ensure bending of the flexible fence more reliably as the cutting means would virtually increase a depth of the groove around the flexible fence in particular with the flexible fence extending from the groove bottom.

In another preferred embodiment, the cutting means is placed on at least one of the cavity face.

According to this arrangement, it is possible to ensure initiation of cutting the material filled in the cavity by cutting means as the cutting means is already contacting with the material to be cut by the cutting means.

In another preferred embodiment, radially outermost end of the cutting means is at the same level as the insert top face.

According to this arrangement, it is possible to ensure bending of the flexible fence more reliably without impacting the depth of the groove in particular with the flexible fence extending from the groove bottom.

In another preferred embodiment, at least one of the cavity face has at least one thin guiding rib on its face facing to the cavity extends in a direction from the insert top face toward the molding surface for guiding a cutting of the material filled in the cavity.

According to this arrangement, it is possible to give an orientation and to control a propagation of the cutting of the material filled in the cavity during demolding as the thin guiding rib is able to provide a local variation of the thickness of the flexible fence.

In another preferred embodiment, a thickness of the thin guiding rib from the cavity face in a direction the groove forming rib portion extends is at least equal to 50% of the distance t between two opposed cavity faces.

If this thickness of the thin guiding rib is less than 50% of the distance t between two opposed cavity faces, there is a risk that the thin guiding rib cannot give sufficient control of the propagation of the cutting of the material filled in the cavity. This thickness of the thin guiding rib is preferably less than 75% of the distance t between two opposed cavity faces for ensuring enough penetration of the material for forming the flexible fence of the closing device into the cavity.

In another preferred embodiment, a length of the cutting means from the cavity face in a direction the groove forming rib portion extends is at least equal to 75% of the distance t between two opposed cavity faces.

If this length of the cutting means is less than 75% of the distance t between two opposed cavity faces, there is a risk that the cutting of the material filled in the cavity by the cutting means is not well initiated.

This length of the cutting means from the cavity face in a direction the groove forming rib portion extends is preferably at least equal to 90% of the distance t between two opposed cavity faces. More preferably this length of the cutting means from the cavity face in a direction the groove forming rib portion extends is equal to the distance t between two opposed cavity faces, and still more preferably at most equal to 98% of the distance t between two opposed cavity faces.

In another preferred embodiment, the cutting means extends as to connect two opposed cavity faces.

According to this arrangement, it is possible to ensure initiation of cutting the material filled in the cavity by cutting means as the cutting means is already contacting with the material to be cut by the cutting means while ensuring precise distance between two opposed cavity faces as the cutting means can act also as a reinforcement portion of the cavity.

In another preferred embodiment, the distance t between two opposed cavity faces is at most equal to 0.6 mm.

If this distance t between two opposed cavity faces is more than 0.6 mm, the closing device molded by the molding element would be too thick to bend with hydrodynamic pressure for liquid drainage as this thickness will substantially be equal to the thickness of the flexible fence of the closing device.

This distance t between two opposed cavity faces is preferably at most equal to 0.4 mm, more preferably at least equal to 0.02 mm.

BRIEF DESCRIPTION OF THE DRAWINGS

Other characteristics and advantages of the disclosure arise from the description made hereafter in reference to the annexed drawings which show, as nonrestrictive examples, the embodiments of the disclosure.

In these drawings:

FIG. 1 is a schematic plan view of a tread for a tire molded with a mold comprising a molding element according to a first embodiment of the present disclosure;

FIG. 2 is an enlarged schematic plan view showing a portion indicated as II in FIG. 1;

FIG. 3 is a schematic cross sectional view taken along line III-III in FIG. 1;

FIG. 4 is a schematic perspective view of a portion of the molding element without an insert according to the first embodiment of the present disclosure;

FIG. 5 is a schematic perspective view of a portion of the molding element with the insert according to the first embodiment of the present disclosure;

FIG. 6 is a schematic perspective view of a portion of an insert according to the first embodiment of the present disclosure;

FIG. 7 is a schematic plan view of the insert according to the first embodiment of the present disclosure;

FIG. 8 is a schematic cross sectional view of a tread for a tire molded with a mold comprising a molding element according to a second embodiment of the present disclosure;

FIG. 9 is a schematic perspective view of a portion of an insert according to the second embodiment of the present disclosure;

FIG. 10 is a schematic plan view of the insert according to the second embodiment of the present disclosure;

FIG. 11 is a schematic cross sectional view of a tread for a tire molded with a mold comprising a molding element according to a third embodiment of the present disclosure;

FIG. 12 is a schematic frontal view of a portion of an insert according to the third embodiment of the present disclosure; and FIG. 13 is a schematic side view of the portion of the insert according to the third embodiment of the present disclosure.

DETAILED DESCRIPTION OF THE ENABLING EMBODIMENTS

Preferred embodiments of the present disclosure will be described below referring to the drawings.

A molding element 1 for a mold used for manufacturing a tread 101 of a tire, a mold comprising the molding element 1, and a tread 101 molded and vulcanized using the mold according to a first embodiment of the present disclosure will be described referring to FIGS. 1 to 7.

FIG. 1 is a schematic plan view of a tread for a tire molded with a mold comprising a molding element according to a first embodiment of the present disclosure. FIG. 2 is an enlarged schematic plan view showing a portion indicated as II in FIG. 1. FIG. 3 is a schematic cross sectional view taken along line in FIG. 1. FIG. 4 is a schematic perspective view of a portion of the molding element without an insert according to the first embodiment of the present disclosure. FIG. 5 is a schematic perspective view of a portion of the molding element with the insert according to the first embodiment of the present disclosure. FIG. 6 is a schematic perspective view of an insert according to the first embodiment of the present disclosure. FIG. 7 is a schematic plan view of the insert according to the first embodiment of the present disclosure.

The tread 101 is a tread for a tire having dimension 205/55R16 and comprises a plurality of contacting element 104 having a contact face 102 intended to come into contact with the ground during rolling, a plurality of groove 103 extending in a tire circumferential direction indicated as XX'. The groove 103 is delimited by two groove sidewalls 1031, 1032 facing each other and being connected by a groove bottom 1033. The groove 103 has a width W at a level of the contact face 102 and a depth D (as shown in FIG. 3).

As shown in FIG. 1, a contact patch 106 has a contact patch length L in a tire circumferential direction when the tire with the tread 101 is mounted onto its standard rim and inflated at its nominal pressure and its nominal load is applied. According to 'ETRTO Standard Manual 2016' the standard rim for this size is 6.5 J, the nominal pressure is 250 kPa and the nominal load is 615 kg.

As shown in FIG. 1, in the groove 103, a plurality of closing device 105 is provided. The closing device 105 comprises one first flexible fence 1051*a* and two second flexible fences 1051*b* for dividing an air column between the ground and the groove 103 in the contact patch 106 during rolling. The closing devices 105 are provided at a regular interval of distance P in the groove 103. The distance P is preferably shorter than the contact patch length L as to at least one closing device 105 in each groove 103 is always located in the contact patch 106 during rolling.

The first flexible fence 1051*a* and two second flexible fences 1051*b* of the closing device 105 are positioned in one plane perpendicular to an orientation the groove 103 extends, and have a same thickness of t, as shown in FIG. 2. The first flexible fence 1051*a* extends from the groove bottom 1033, and two second flexible fences 1051*b* extend from groove sidewalls 1031, 1032.

The first and the second flexible fences 1051*a*, 1051*b* do not overlap each other in a circumferential direction (in sectional view of the groove 103). The first and the second flexible fences 1051*a*, 1051*b* cover at least equal to 70% of the cross sectional area of the groove 103, as shown in FIG. 3.

As shown in FIG. 3, the first flexible fence 1051*a* has a trapezoid shape and extends from the groove bottom 1033 toward radially outward direction of the tread 101. The width of the first flexible fence 1051*a* is substantially equal to the width of the groove bottom 1033 at its bottom and gradually increasing its width toward radially outward direction of the tread 101. The height of the first flexible fence 1051*a* is substantially equal to the depth D of the groove 103.

As shown in FIG. 3, two of the second flexible fences 1051*b* have triangular shape and each the second flexible fence 1051*b* covers minor part of the groove 103. The radial length of each the second flexible fence 1051*b* is also substantially equal to the depth D of the groove 103.

The tread 101 has the same structure as the conventional tread except for an arrangement regarding the closing device 105 and is intended to be applied to a conventional pneumatic radial tire and other non-pneumatic tire. Thus, description of the internal construction of the tread 101 will be omitted.

The groove 103 is provided with the plurality of closing device 105 each covering at least equal to 70% of the radial cross sectional area of the groove 103. Therefore, the length of the air column formed by the groove 103 in the contact patch 106 is shifted to a length whose groove resonance peak is outside of the frequency audible range for the human ear. Thus, groove resonance due to air column resonance of the groove 103 can be harmless.

Next, a molding element 1 for a mold used for manufacturing the tread 101 will be described referring to FIGS. 4, 5, 6 and 7.

As shown in FIG. 4, the molding element 1 has a base portion 2 having a molding surface 21 intended to mold the contact face 102 of the contacting element 104. The base portion 2 has two side faces 11, 12 facing to circumferentially opposed directions. These side surfaces 11, 12 define circumferential extremities of the molding element 1.

In use, one side face 11 or 12 of one molding element 1 is contacted to the other side face 12 or 11 of the adjacent molding elements to form a mold.

As shown in FIG. 4, the molding element 1 also has a groove forming rib portion 3. The groove forming rib portion 3 has a trapezoid cross section and integrally extends from the molding surface 21 of the base portion 2 in a radially inward direction of the molding element 1.

The groove forming rib portion 3 includes two opposed rib side faces 31, 32 intended to mold two opposed groove side faces 1031, 1032, and a rib top face 33 intended to mold a bottom of the groove 1033. In case plurality of groove forming rib portions 3 is provided in one molding element 1, a radial position of the rib top face 33 can be the same among these groove forming rib portions 3, or can be different among these groove forming rib portions 3.

The circumferential length of the groove forming rib portion 3 is shorter than that of the base portion 2 by length T. As shown in FIG. 4, a circumferential end surface 3' of the groove forming rib portion 3 is placed at a position backwardly from the side face 12 of the base portion 2 by length T. Further, a rectangular area in the side face 12 below the groove forming rib portion 3 is backwardly offset from the side face 12 of the base portion 2 by length T so as to form, together with a portion facing to the circumferential end surface 3' of the groove forming rib portion 3, a space 35 having depth T and as to open to two rib side faces 31, 32 and to the rib top face 33.

The molding element 1 also comprises an insert 5 including an upper portion 5a having a trapezoid cross section identical to that of the groove forming rib portion 3 and a lower portion 5b having a rectangular cross section identical to that of the rectangular area of the space 35, as shown in FIG. 5.

The insert 5 has two insert side faces 51, 52 which at least one of the insert side face being for forming a portion of the groove side face 1031, 1032 with the rib side face 31, 32 of the groove forming rib portion 3, and an insert top face 53 for forming a portion of the groove bottom 1033 with the rib top face 33 of the groove forming rib portion 3.

The insert 5 is fixedly secured to the base portion 2 and the groove forming rib portion 3 such that the upper portion 5a abuts against the circumferential end surface 3' of the groove forming rib portion 3 and the lower portion 5b is received in the rectangular recessed space 35, as shown in FIG. 5.

Thickness of the insert 5 is the same as the above offset length T of the circumferential end surface 3' of the groove forming rib portion 3 and the depth T of the rectangular recessed space 35. Therefore, the surface 5' of the insert 5 is flush with the side face 12 of the base portion 2. At the same time, insert the side faces 51, 52 of the insert 5 are flush with the rib side faces 31, 32 of the groove forming rib portion 3 respectively, the insert top face 53 of the insert 5 is flush with the rib top face 33 of the groove forming rib portion 3.

The insert 5 is fixed to the molding element 1 by a fixing means such as a screw extending through a hole 351 in a groove forming rib portion 3 and a hole 55 in the insert 5.

The insert 5 may be fixed to the molding element 1 by other manner such as welding, gluing, etc. In such case, the holes 55, 351 may not be provided.

The insert 5 can be placed at any part of the groove forming rib portion 3. In case, a space for receiving the insert 5 is provided at a position which is not facing to the side face 11, 12 of the molding element 1, the insert 5 can be placed so as to be disclosed in WO2010/146180A1, for example.

The insert 5 comprises a cavity 7 for forming a closing device 105 in the groove 103 having a cavity face 71, as shown in FIG. 6. In use, the cavity 7 is formed together with other cavity face 72 opposed to the cavity face 71 which is provided with a part 5" of the insert 5, as to that the cavity 7 opens to the two insert side faces 51, 52 and to the insert top face 53 with a distance t, as shown in FIG. 7. In the present embodiment, this distance t is 0.5 mm.

As shown in FIG. 6 and in FIG. 7, the insert 5 comprises two cutting means 6 projecting from the cavity face 71 in a direction the groove forming rib portion 3 extends for cutting a material filled in the cavity 7 during demolding. The cavity face 71 has two thin guiding ribs 75 on its face facing to the cavity 7 extends from the cutting means 6 in a direction from the insert top face 53 toward the molding surface 21, that is to say substantially in radial orientation, for guiding a cutting of the material filled in the cavity 7.

The cutting means 6 has a inversed teardrop shape in a frontal view and has a length at least equal to 75% of the distance t between two opposed cavity faces 71, 72 in a direction the groove forming rib portion 3 extends. This length of the cutting means 6 in the direction the groove forming rib portion 3 extends is preferably at least equal to 90% of the distance t between two opposed cavity faces 71, 72, more preferably equal to the distance t and still more preferably at most equal to 98% of the distance t. A radially outermost end of the cutting means 6 is substantially the same level as the insert top face 53. In the present embodiment, the cutting means 6 extends as to connect two opposed cavity faces 71, 72.

The thin guiding rib 75 has a rectangular shape, and a thickness in a direction the groove forming rib portion 3 extends is at least equal to 50% of the distance t between two opposed cavity faces 71, 72, more preferably less than 75% of the distance t.

Since the space 35 opens to the rib top face 33 and to both the rib side faces 31, 32, and the cavity 7 opens to the insert top face 53 and to both the insert side faces 51, 52, and the insert 5 comprises at two cutting means 6, it is possible to improve productivity of the tread 101 provided with the flexible fence of the closing device 105 in the groove 103, as it is possible to secure the entrance reliably to facilitate the penetration of the material for forming the flexible fence of the closing device 105 into the cavity 7 during molding.

Having the sufficient entrance to facilitate the penetration of the material for forming the flexible fence of the closing device 105 into the cavity 7 leading a good molding of the flexible fence even a thickness of the flexible fence is thin, resulting improvement on productivity for manufacturing the tread 101 provided with the flexible fence of the closing device 105 in the groove 103 while ensuring an accurate and thin thickness of the flexible fence of the closing device 105 to permit a correct bending for liquid drainage.

With the cutting means 6 projecting in the direction the groove forming rib portion 3 extends for cutting the material filled in the cavity 7 during demolding, forming of the flexible fence of the closing device 105 is able to complete with an action during demolding without any additional process; with the action during demolding, the cutting means 6 forms the flexible fence of the closing device 105 by cutting the material filled in the cavity 7 of the insert 5, resulting further improvement on productivity for manufacturing the tread 101 provided with the flexible fence of the closing device 105 in the groove 103.

By comprising two cutting means 6, it is possible to obtain one flexible fence extending from the groove bottom 1033 and two flexible fences extending from each the groove side faces 1031, 1032 that would provide increasing degree of freedom to design and to position the flexible fence of the closing device 105 while ensuring that the closing device 105 effectively covering as broader cross sectional area of the groove 103 as possible.

Since the cutting means 6 is placed on the cavity face 71 (or 72), it is possible to ensure initiation of cutting the material filled in the cavity 7 by cutting means 6 as the cutting means 6 is already contacting with the material to be cut by the cutting means 6.

The radially outermost end of the cutting means 6 substantially the same level as the insert top face 35 makes it possible to ensure bending of the flexible fence more reliably without impacting the depth of the groove 103 in particular with the flexible fence extending from the groove bottom 1033.

Since the cavity face 71 (or 72) has the thin guiding rib 75 on its face facing to the cavity 7 extends in a direction from the insert top face 53 toward the molding surface 21 for guiding a cutting of the material filled in the cavity 7, it is possible to give an orientation and to control a propagation of the cutting of the material filled in the cavity 7 during demolding as the thin guiding rib 75 is able to provide a local variation of the thickness of the flexible fence.

The thickness of the thin guiding rib 75 from the cavity face 71 (or 72) in the direction the groove forming rib portion 3 extends at least equal to 50% of the distance t between two opposed cavity faces 71, 72 provides sufficient control of the propagation of the cutting of the material filled in the cavity 7 and enough penetration of the material for forming the flexible fence of the closing device 103 into the cavity 7 at the same time. On the other words, if this thickness of the thin guiding rib 75 is less than 50% of the distance t between two opposed cavity faces 71, 72, there is a risk that the thin guiding rib 75 cannot give sufficient control of the propagation of the cutting of the material filled in the cavity 7. This thickness of the thin guiding rib 75 is preferably less than 75% of the distance t between two opposed cavity faces 71, 72 for ensuring enough penetration of the material for forming the flexible fence of the closing device 105 into the cavity 7.

The length of the cutting means 6 from the cavity face 71 (or 72) in the direction the groove forming rib portion 3 extends at least equal to 75% of the distance t between two opposed cavity faces 71, 72 ensure good initiation of the cutting of the material filled in the cavity 7 by the cutting means 6. On the other words, if this length of the cutting means is less than 75% of the distance t between two opposed cavity faces, there is a risk that the cutting of the material filled in the cavity by the cutting means is not well initiated. This length of the cutting means 6 from the cavity face 71 (or 72) in the direction the groove forming rib portion 3 extends is preferably at least equal to 90% of the distance t between two opposed cavity faces 71, 72. More preferably this length of the cutting means 6 from the cavity face 71 (or 72) in a direction the groove forming rib portion 3 extends is equal to the distance t between two opposed cavity faces 71, 72, and still more preferably at most equal to 98% of the distance t between two opposed cavity faces 71, 72.

Since the cutting means 6 extends as to connect two opposed cavity faces 71, 72, it is possible to ensure initiation of cutting the material filled in the cavity 7 by cutting means 6 as the cutting means 6 is already contacting with the material to be cut by the cutting means 6 while ensuring precise distance between two opposed cavity faces 71, 72 as the cutting means 6 can act also as a reinforcement portion of the cavity 7.

Since the distance t between two opposed cavity face 71, 72 is at most equal to 0.6 mm, the flexible fence of the closing device 105 can bend appropriately with hydrodynamic pressure for liquid drainage. On the other words, if this distance t between two opposed cavity faces 71, 72 is more than 0.6 mm, the closing device 105 molded by the molding element 1 would be too thick to bend with hydrodynamic pressure for liquid drainage as this thickness will substantially be equal to the thickness of the flexible fence of the closing device 105. This distance t between two opposed cavity faces 71, 72 is preferably at most equal to 0.4 mm, more preferably at least equal to 0.02 mm.

In the present embodiment, the insert 5 is provided with a hole 55 as a portion for receiving fixing means. However, in case any elements for fixing the insert 5 to the space 35 of the molding element 1 is not necessary, the hole 55 may not be provided.

Any material able to resist to a force applied during vulcanization, for example metal, resin, plastic or composite material, is usable for configuring the insert 5, the cutting means 6 and the thin guiding rib 75. The cutting means 6 and/or the thin guiding rib 75 may be manufactured separately and is/are assembled with the insert 5 by any known manner such as welding, gluing, etc., may be manufactured all together by any know manner such as milling, sintering, engraving, etc. The cutting means 6 and/or the thin guiding rib 75 may be embedded into the insert 5 or the groove forming rib portion 3.

The shape of the cutting means 6 can be any shape able to initiate the cutting of the material filled in the cavity 7, such as triangular, rectangular, pentagonal, circular, pin-like, rod-like, wire-like or knife-like shape. Several shapes may be combined into one single cutting means 6.

The shape of the thin guiding rib 75 can be any shape able to guide the cutting of the material filled in the cavity 7 during demolding such as triangular shape, rounded shape, etc. The thickness of the thin guiding rib 75 may vary, the thin guiding rib 75 may extend in discontinuous manner.

The cutting means 6 and the thin guiding rib 75 may be provided on different cavity faces 71, 72. In case plural cutting means 6 are provided in one single insert 5, the cutting means 6 may be provided on different cavity faces 71, 72. In case plural thin guiding rib 75 are provided in one single insert 5, the thin guiding rib 75 may be provided on different cavity faces 71, 72.

In case the insert 5 doesn't have the part 5" creating the cavity 7 together, the side face 11 (or 12) of the adjacent molding element 1 when in use may be act as the opposed cavity face 72 (or 71) to form the cavity 7. Such the side face 11 (or 12) may comprise the cutting means 6 and/or the thin guiding rib 75.

The insert 5, including the cutting means 6 and/or the thin guiding rib 75 may be covered completely or partly with a non-stick material for better and easier demolding. The non-sticking material is, for example xylene.

A molding element according to a second embodiment of the present disclosure will be described referring to FIGS. 8, 9 and 10. FIG. 8 is a schematic cross sectional view of a tread for a tire molded with a mold comprising a molding element according to the second embodiment of the present disclosure. FIG. 9 is a schematic perspective view of a portion of an insert according to the second embodiment of the present disclosure. FIG. 10 is a schematic plan view of the insert according to the second embodiment of the present disclosure. The constitution of this second embodiment is similar to that of the first embodiment other than the arrangement shown in FIGS. 8 to 10, thus description will be made referring to FIGS. 8 to 10.

As shown in FIG. 8, a tread 201 comprises a plurality of contacting element 204 having a contact face 202 intended to come into contact with the ground during rolling and a groove 203 delimited by two groove sidewalls 2031, 2032 facing each other and being connected by a groove bottom 2033. The groove 203 has a width W at a level of the contact face 203 and a depth D.

In the groove 203, a plurality of closing device 205 is provided. The closing device 205 comprises one first flexible fence 2051a and one second flexible fence 2051b for dividing an air column between the ground and the groove 203. The first flexible fence 2051a extends from the groove bottom 2033, and the second flexible fence 2051b extends from one groove sidewall 2031. No flexible fence is connected to another groove sidewall 2032. The closing device 205 covers at least equal to 70% of the cross sectional area of the groove 203, as shown in FIG. 8.

As shown in FIG. 8, the first flexible fence 2051a has a trapezoid shape and extends from the groove bottom 2033 toward radially outward direction of the tread 201. The width of the first flexible fence 2051a is substantially equal to the width of the groove bottom 2033 at its bottom and gradually increasing its width toward radially outward direction of the tread 201. The height of the first flexible fence 2051a is substantially equal to the depth D of the groove 203. The second flexible fence 2051b has triangular shape and covers minor part of the groove 203. The radial length of the second flexible fence 2051b is also substantially equal to the depth D of the groove 203. An intersection between the first flexible fence 2051a and the second flexible fence 2051b penetrates to a level radially below the groove bottom 2033.

An insert 25 comprises a cavity 27 for forming a closing device 205 in the groove 203 having a cavity face 271, as shown in FIG. 9. In use, the cavity 27 is formed together with other cavity face 272 opposed to the cavity face 271 which is provided with a part 25" of the insert 25, as to that the cavity 27 opens to the insert side face 251 and to the insert top face 253 with a distance t, as shown in FIG. 10. In the present embodiment, this distance t is 0.6 mm.

The insert 25 is provided with a hole 255 for fixing the insert 25 to the molding element 1 by a fixing means such as a screw.

As shown in FIG. 9 and in FIG. 10, the insert 25 comprises one cutting means 26 placed on the insert top face 253 as to extend above the cavity 27 in a direction a groove forming rib portion 3 extends.

The cutting means 26 has a wire-like shape and has a length at least equal to 75% of a distance t between two opposed cavity faces 271, 272 in the direction the groove forming rib portion 3 extends. In the present embodiment, this length of the cutting means 26 is longer than the distance t between two opposed cavity faces 271, 272, as shown in FIG. 10.

Since the cavity 27 opens to the insert top face 253 and to the insert side face 251, and the insert 25 comprises one cutting means 26, it is possible to improve productivity of the tread 201 provided with the flexible fence of the closing device 205 in the groove 203, as it is possible to secure the entrance reliably to facilitate the penetration of the material for forming the flexible fence of the closing device 205 into the cavity 27 during molding.

Having the sufficient entrance to facilitate the penetration of the material for forming the flexible fence of the closing device 205 into the cavity 27 leading a good molding of the flexible fence even a thickness of the flexible fence is thin, resulting improvement on productivity for manufacturing the tread 201 provided with the flexible fence of the closing device 205 in the groove 203 while ensuring an accurate and thin thickness of the flexible fence of the closing device 205 to permit a correct bending for liquid drainage.

Since the cutting means 6 is placed on the insert top face 253 as to extend above the cavity 27 in the direction the groove forming rib portion 3 extends, it is possible to ensure bending of the flexible fence more reliably as the cutting means 6 would virtually increase a depth of the groove 203 around the flexible fence in particular with the flexible fence extending from the groove bottom 2033.

A molding element according to a third embodiment of the present disclosure will be described referring to FIGS. 11, 12 and 13. FIG. 11 is a schematic cross sectional view of a tread for a tire molded with a mold comprising a molding element according to the third embodiment of the present disclosure. FIG. 12 is a schematic frontal view of a portion of an insert according to the third embodiment of the present disclosure. FIG. 13 is a schematic side view of the portion of the insert according to the third embodiment of the present disclosure. The constitution of this second embodiment is similar to that of the first embodiment other than the arrangement shown in FIGS. 11 to 13, thus description will be made referring to FIGS. 11 to 13.

As shown in FIG. 11, a tread 401 comprises a plurality of contacting element 404 having a contact face 402 intended to come into contact with the ground during rolling and a groove 403 delimited by two groove sidewalls 4031, 4032 facing each other and being connected by a groove bottom 4033. The groove 403 has a width W at a level of the contact face 403 and a depth D.

In the groove 403, a plurality of closing device 405 is provided. The closing device 405 comprises one first flexible fence 4051a and two second flexible fences 4051b for dividing an air column between the ground and the groove 403. The first flexible fence 4051a extends from the groove bottom 4033, and the two second flexible fences 2051b extend from each the groove sidewalls 4031, 4032. The closing device 405 covers at least equal to 70% of the cross sectional area of the groove 403, as shown in FIG. 11.

As shown in FIG. 11, an interface between the first flexible fence 4051a extending from the groove bottom 4033 and the second flexible fence 4051b extending from the groove sidewalls 4031, 4032 extends obliquely upwardly from a position close to an interface between the groove bottom 4033 and the groove sidewall 4031, 4032 till around a middle of the depth D of the groove 403, then radially upwardly toward the contact face 402 of the contacting element 404. The width of the first flexible fence 4051a is substantially equal to the width of the groove bottom 4033 at its bottom and gradually decreasing its width till around the middle of the groove 403, then it becomes constant toward radially outward direction of the tread 401. The height of the first flexible fence 4051a is substantially equal to the depth D of the groove 403. The second flexible fences 4051b both have trapezoid. The radial length of the second flexible fences 4051b is also substantially equal to the depth D of the groove 403. The intersection between the first flexible fence 4051a and the second flexible fence 4051b is wider at its portion closer to the groove bottom 4033 than the portion closer to the contact face 402. The width of the first flexible fence 4051a is narrower than the width of the second flexible fence 4051b at the level of the contact face 402.

An insert 45 comprises a cavity 47 for forming a closing device 405 in the groove 403 having a cavity face 471, as shown in FIG. 12. The insert 45 is provided with a hole 455 for fixing the insert 45 to the molding element 1 by a fixing means such as a screw.

As shown in FIG. 12 and in FIG. 13, the insert 45 comprises two cutting means 46 placed on the cavity face 471 as to extend obliquely downwardly from around an intersection between the insert top face 453 and the insert side face 451, 452 till around middle in radial orientation of the cavity face 471. From radially innermost position of each the cutting means 46, a thin guiding rib 475 is extending on the cavity face 471 toward the molding surface 21, that is to say substantially in radial orientation, for guiding a cutting of the material filled in the cavity 47.

The cutting means 46 has substantially rectangular shape in a frontal view as to face one corner of the cutting means 46 has an acute angle and is facing to radially inward orientation. A length of the cutting means 46 from the cavity face 471 in a direction the groove forming rib portion 3 extends is substantially equal to a distance t between two opposed cavity faces creating the cavity 47 as to connect two opposed cavity faces.

The thin guiding rib 475 has a triangular shape. A thickness of the thin guiding rib 475 from the cavity face 471 in the direction the groove forming rib portion 3 extends is at least equal to 50% of the distance t between two opposed cavity faces.

Since the cutting means 46 has substantially the same length as the distance t between two opposed cavity faces while extending obliquely, it is possible to provide a greater degree of freedom to design and to position the flexible fence of the closing device 405 while ensuring that the closing device effectively covering as broader cross sectional area of the groove 403 as possible. Also at the same time, it is possible to ensure initiation of cutting the material filled in the cavity 47 by cutting means 46 as the cutting means 46 is already contacting with the material to be cut by the cutting means 46 while ensuring precise distance between two opposed cavity faces as the cutting means 46 can act also as a reinforcement portion of the cavity 47.

The disclosure is not limited to the examples described and represented and various modifications can be made there without leaving its framework.

REFERENCE SIGNS LIST 1 molding element
11, 12 side face
2 base portion
21 molding surface
3 groove forming rib portion
31, 32 rib side face
33 rib top face
35 space
351 hole
5 insert
51, 52 insert side face
53 insert top face
55 hole
6 cutting means
7 cavity
71, 72 cavity face
75 thin guiding rib
101 tread
102 contact face
103 groove
1031, 1032 groove side face
1033 groove bottom
104 contacting element
105 closing device
1051 flexible fence
106 contact patch

What is claimed is:

1. A molding element for a mold used for manufacturing a tread of a tire having a plurality of contacting element delimited by a plurality of groove, the molding element having a molding surface for forming a contact face of the contacting elements intended to come into contact with ground during rolling and a groove forming rib portion for forming the groove comprising two opposed rib side faces for forming two opposed groove side faces and a rib top face connecting two rib side faces for forming a groove bottom, the groove forming rib portion providing at least one space opening to at least one of the rib side faces and/or to the rib top face and an insert being received in the space, the insert having two insert side faces which at least one of the insert side face being for forming a portion of the groove side face with the rib side face and an insert top face for forming a portion of the groove bottom with the rib top face, the insert comprising a cavity for forming a closing device in the groove, the cavity having two opposed cavity faces distant in a direction the groove forming rib portion extending with a distance t,
wherein the cavity opens to at least two faces of the insert corresponding to the faces of the groove forming rib portion the space being opening to, and wherein the insert comprises at least one cutting means extending and/or projecting in a direction the groove forming rib portion extends for cutting a material filled in the cavity during demolding.

2. The molding element according to claim 1, wherein the space opens to the rib top face and to both the rib side faces, and wherein the cavity opens to the insert top face and to both the insert side faces, and wherein the insert comprises at least two cutting means.

3. The molding element according to claim 1, wherein the cutting means is placed on the insert top face as to protrude into or to extend above the cavity in a direction the groove forming rib portion extends.

4. The molding element according to claim 1, wherein the cutting means is placed on at least one of the cavity face.

5. The molding element according to claim 4, wherein radially outermost end of the cutting means is at the same level as the insert top face.

6. The molding element according to claim 1, wherein at least one of the cavity face has at least one thin guiding rib on its face facing to the cavity extends in a direction from the insert top face toward the molding surface for guiding a cutting of the material filled in the cavity.

7. The molding element according to claim 6, wherein a thickness of the thin guiding rib from the cavity face in a direction the groove forming rib portion extends is at least equal to 50% of the distance t between two opposed cavity faces.

8. The molding element according to claim 1, wherein a length of the cutting means from the cavity face in a direction the groove forming rib portion extends is at least equal to 75% of the distance t between two opposed cavity faces.

9. The molding element according to claim 8, wherein the length of the cutting means from the cavity face in a direction the groove forming rib portion extends is at least equal to 90% of the distance t between two opposed cavity faces.

10. The molding element according to claim 9, wherein the cutting means extends as to connect two opposed cavity faces.

11. The molding element according to claim 1, wherein the distance t between two opposed cavity faces is at most equal to 0.6 mm.

12. The molding element according to claim 11, wherein the distance t between two opposed cavity faces is at most equal to 0.4 mm.

* * * * *